May 29, 1934.  H. E. DOERR  1,960,299
WHEEL
Filed Jan. 23, 1932  3 Sheets-Sheet 1
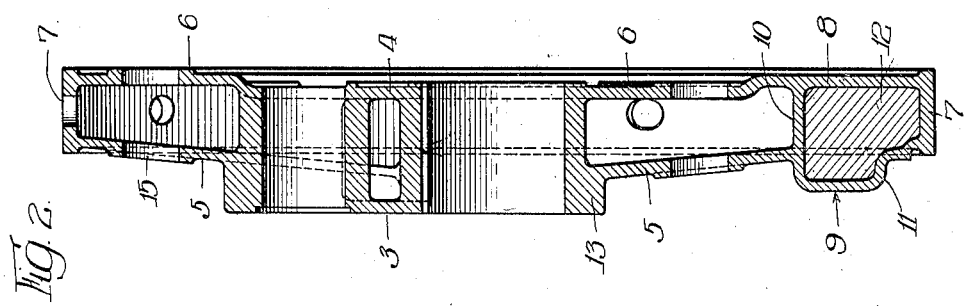
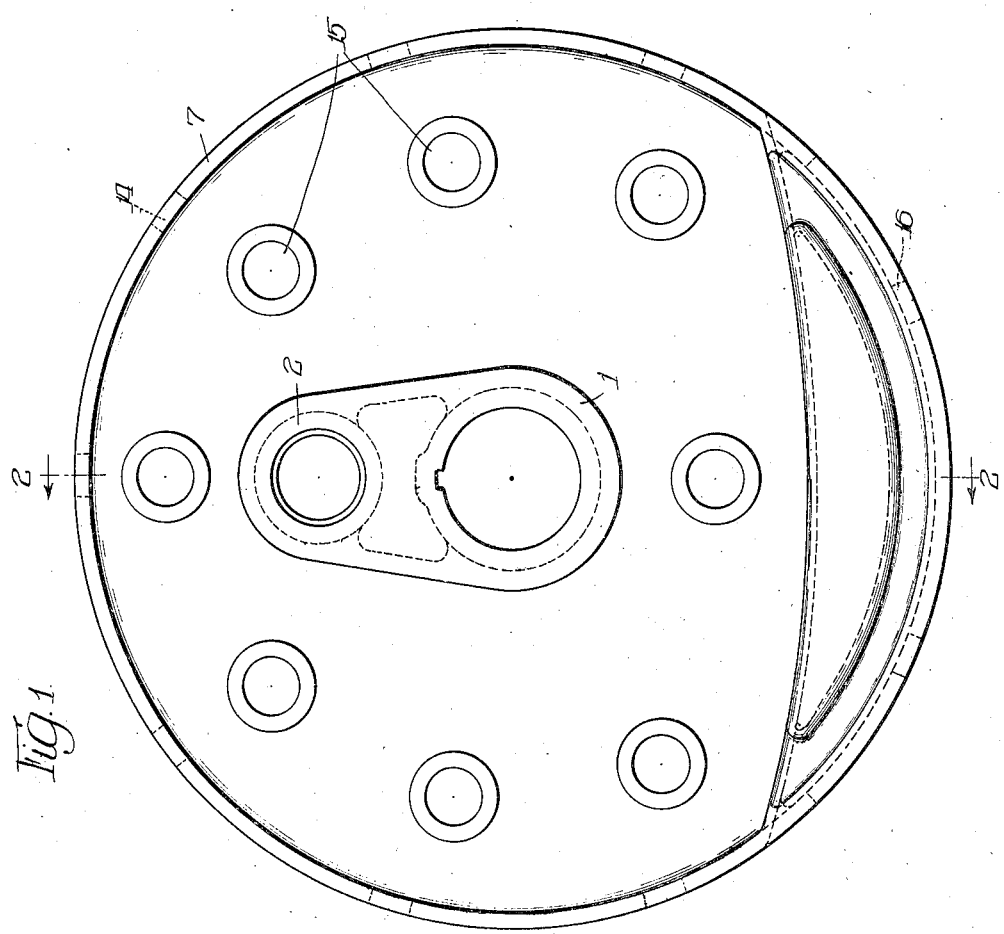
Inventor:
Harry E. Doerr,
By Wilkinson Huxley Byron + Knight
Attys.

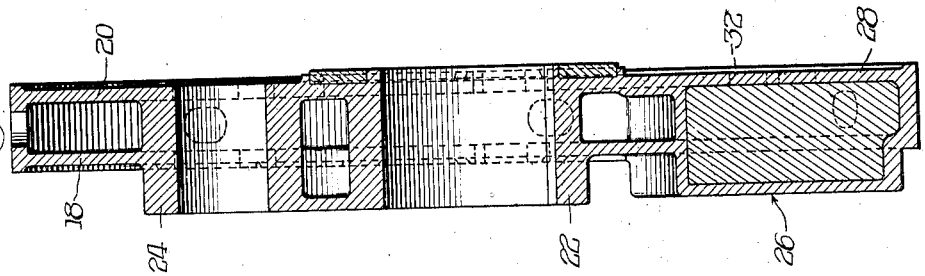
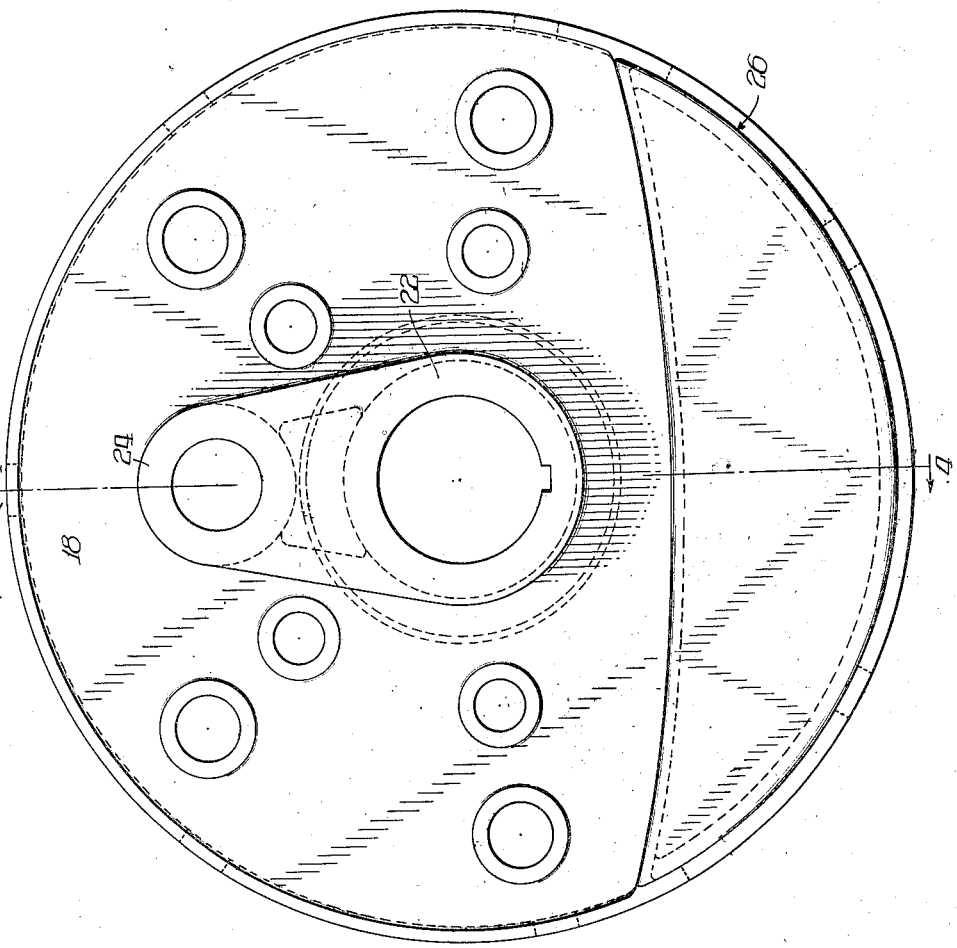

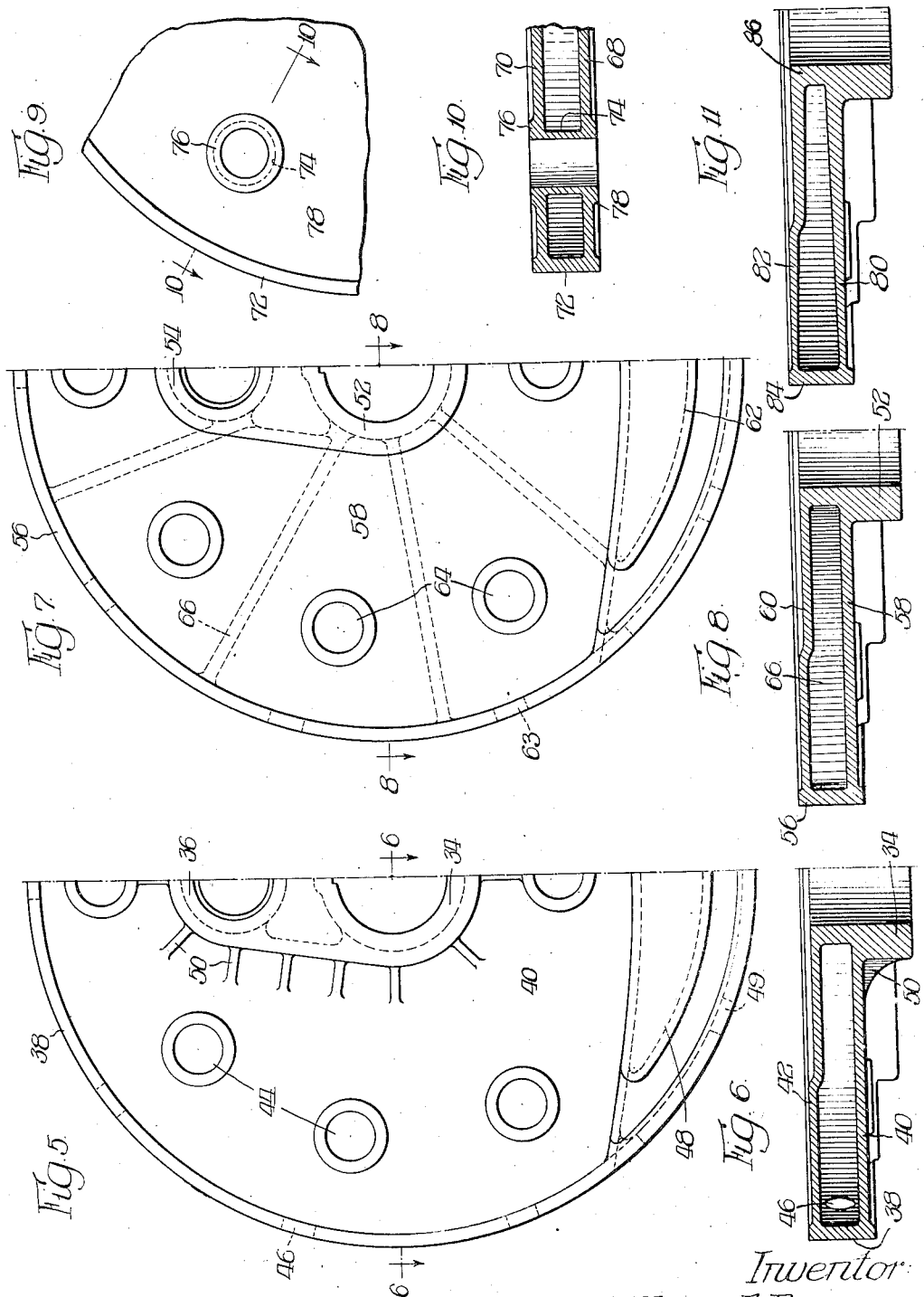

Patented May 29, 1934

1,960,299

UNITED STATES PATENT OFFICE 1,960,299

WHEEL

Harry E. Doerr, St. Louis, Mo.

Application January 23, 1932, Serial No. 588,291

19 Claims. (Cl. 295—2)

The present invention relates to car wheels and more in particular to locomotive drive wheels.

Among the objects of the present invention is to provide a car wheel in which the hub and rim portions thereof are integrally connected by means of spaced web portions, thus adding strength and increasing the tendency to resist breakage adjacent the hub.

Another object of the present invention is to provide a car wheel which is substantially lighter in weight than a car wheel constructed for similar use but of the well-known spoke type.

Still another object of the present invention is to provide a car wheel construction in which the entire wheel during the casting thereof will shrink uniformly, thus eliminating casting stresses adjacent the hub and rim portions thereof so as to provide a wheel of relatively greater strength in a lateral direction than a corresponding wheel of the spoke type. More specifically, such casting stresses are eliminated by forming the wheel with webs integrally connecting the hub and rim portions.

The present invention contemplates the idea of providing a novel locomotive drive wheel in which the hub and rim portions thereof are integrally connected by means of spaced webs, a counter-balance portion being further provided between a portion of the rim and these spaced webs.

Another object within the purview of the present invention is to provide a novel locomotive drive wheel in which the counter-balance portion is of hollow or pocket construction, which may be easily and readily filled with some material heavier than the material from which the locomotive drive wheel may be formed.

Still another object of the present invention is to provide a novel locomotive drive wheel in which the rim and counter-balance portions are integrally connected with the hubs thereof as by means of a plurality of spaced webs, thus increasing the strength and durability of the resulting structure.

A still further object of the present invention is to provide a locomotive drive wheel construction in which the counter-balance portion of hollow or pocket construction has a wall thereof forming a part of the rim portion of the wheel and in which the rim and counter-balance portions are integrally connected to the hubs by means of a plurality of spaced webs, suitable openings being provided in the wheel whereby access may be gained to the space between these webs and to the counter-balance pocket for easy removal of the core forming material.

Other objects, features, capabilities and advantages are comprehended by the invention, as will later appear and as are inherently possessed thereby.

Referring to the drawings:

Figure 1 is a view in elevation of a car wheel made in accordance with the present invention;

Figure 2 is a view in cross section taken in a plane represented by line 2—2 of Figure 1 of the drawings;

Figure 3 is a view in elevation of another embodiment of a car wheel made in accordance with the present invention;

Figure 4 is a view in cross section taken in a plane represented by line 4—4 of Figure 3 of the drawings;

Figure 5 is a fragmentary view in elevation of an alternative car wheel construction made in accordance with the present invention;

Figure 6 is a fragmentary view in cross section taken in a plane represented by line 6—6 of Figure 5 of the drawings;

Figure 7 is a fragmentary view in elevation of another modified car wheel construction made in accordance with the present invention;

Figure 8 is a fragmentary view in cross section taken in a plane represented by line 8—8 of Figure 7 of the drawings;

Figure 9 is a fragmentary view in elevation of a car wheel made in accordance with the present invention and disclosing means for reinforcing the webs thereof;

Figure 10 is a fragmentary view in cross section taken in a plane represented by line 10—10 of Figure 9 of the drawings; and Figure 11 is a fragmentary view in cross section of still another modified form of car wheel made in accordance with the present invention.

Referring now more in detail to the drawings, an embodiment selected to illustrate the present invention is shown in connection with a locomotive drive wheel or center and comprises a wheel or main hub 1 and a crank pin hub 2 spaced therefrom and integrally connected thereto, as by means of the spaced web portions 3 and 4. Extending outwardly and radially from the hub portions 1 and 2 are the integral and spaced webs 5 and 6 which merge at their periphery with an integral rim portion 7, the web 6 adjacent its lower portion merging with an integrally formed web 8 forming one of the walls of the counter-balance portion, generally referred to as 9.

The lower portion of the web 5 merges intermediate the ends of a transversely disposed wall portion 10 of the counter-balance 9, this counter-balance 9 being further formed with a wall 11 spaced in relation to the wall 8 and being integrally connected with the transversely disposed wall 10, as likewise the rim 7, thereby forming a hollow chamber or pocket 12. As is apparent from Figure 2 of the drawings, the web or disc 5 is inclined uniformly outwardly and away from the web or disc 6 and intersects the end portion 13 of the main hub in a plane substantially parallel to the plane of the web 6, the intersection of this web 5 and the crank-pin hub, however, being in the plane of the web 5. The angular disposition of the web 5 provides a wheel of increased strength adjacent the intersection of the web 5 and hubs 1 and 2 and adapted to withstand greater forces and loads in a lateral direction. Although it is of course understood that the counter-balance portion 9 may be formed solid, this counter-balance portion, as shown in the present embodiment, is of hollow or pocket construction in order that the same may be filled with a heavier substance or material, such as lead, or the like, to increase the weight thereof, if desired.

In order to facilitate the removal of core forming material disposed within the chamber or opening between the webs or discs 5 and 6, the rim 7 may be formed with a plurality of openings such as the openings 14, or the webs or discs 5 and 6 may be formed with the openings, such as 15, or if desired, these elements may both be provided with these openings, as clearly shown in the drawings. Similar access to the chamber or pocket 12 of the counter-balance portion is gained by way of the openings 16 formed in the rim portion 7.

In forming a completed locomotive drive wheel, it is of course understood that flanged tires or treads may be shrunk on or otherwise secured to the rim portion 7 of the present wheel construction, or if desired, this flanged tire or tread may be formed integrally with the rim portion. It is of course to be understood that the term "wheel" as used in the specification and claims is sufficiently broad in scope to include a wheel whether the same be for a locomotive or otherwise, and whether the same be in the form of a center to which is secured a flanged tread or whether this tread be constructed integral with the remaining portions. With the present construction, it will be clearly seen that it is possible to make a car wheel of substantial uniform sections of material, thus eliminating casting stresses due to uneven shrinkage of the metal during cooling and providing a wheel in which the strength thereof is greatly increased over the former spoke-type wheel. This construction further increases the strength of the wheel in a lateral direction while decreasing the amount of metal required for wheels designed for any given service requirements as compared with similar wheels of the spoke type.

In the drawings, the substantially continuous web 6 constitutes the inside or rear disc of the completed wheel, while the substantially continuous web 5 angularly disposed in relation therewith and being frusto-conical in shape constitutes the front or outside disc of the finished wheel. It will be noted that the hubs 1 and 2 have their inside end within the plane of the wheel and outwardly of the plane of the inside edge of the rim portion 7 and the disc or web 6 extends between the hubs 1 and 2 and rim portion 7 from adjacent the inside end of the hubs and has the periphery thereof terminating in the rim portion adjacent the inside edge thereof.

The hubs 1 and 2 extend outwardly from the inside end within the plane of the wheel to terminate at a plane in spaced relation to the plane of the front or outside edge of the rim portion 7. The disc or web 5 of frusto-conical shape extends inwardly from adjacent the outside edge of the rim portion 7 and terminates in the main hub 1 in a plane outwardly of or in spaced relation to the plane of the outside edge of the rim portion 7, the same being intercepted by the crank pin hub 2 and terminating therewith at the extreme outer position adjacent but outwardly of said plane of the outside edge of the rim portion. The portion of the web or disc 5 extending from the main hub 1 to the counter-balance pocket 9 terminates in the wall 10 in spaced relation with the disc or web 6.

It will be clearly apparent that when the locomotive drive wheel of the present invention is completed and in use, the inside or rear disc 6 is subjected to compressive stresses, while the outside or front disc or web 5 is subjected to tensile stresses. The wheel therefore acts as a truss member, the inside or rear web acting as a chord under compression between the rim portion 7 and the front disc or web 5 serving as chord members under tension. It will thus be seen that under such conditions the required strength of a locomotive drive wheel may be secured with a minimum of material, thereby reducing the cost of the finished product to a great extent.

In Figures 3 and 4 of the drawings, an alternative construction of a car wheel is disclosed, the same being of substantially identical construction as the wheel shown in Figures 1 and 2 of the drawings, with the exception that the webs 18 and 20 extending outwardly from the main and crank hub portions 22 and 24 are substantially in parallel planes. In this embodiment, the counter-balance portion 26 is shown as being of somewhat more elongated construction in a direction toward the main hub portion 22 and in order to facilitate the more ready removal of core forming material therefrom, the wall 28 which is integral with the web 20 may be formed with one or more openings 32.

In Figures 5 and 6 of the drawings, another car wheel made in accordance with the present invention is disclosed as being formed with a main hub portion 34, a crank pin hub portion 36 and a rim portion 38. As in the previously described embodiments, the rim and hub portions are integrally connected by spaced webs 40 and 42 which are provided with a plurality of openings such as 44, whereby core forming material between these webs may be easily and readily removed. The rim portion 38 is likewise formed with a plurality of openings 46 for assisting in removing this core forming material. As in the embodiment shown in Figures 1 to 4 of the drawings, the present wheel is provided with a pocket or box-like counter-balance portion 48 of substantially the same construction as the counter-balance portion 9 and having openings 49 formed in the rim part thereof for the purposes disclosed. In the present embodiment, a plurality of reinforcing ribs 50 is shown as being integrally formed with the web 40 and hub portions 34 and 36 which extend outwardly from the latter, these ribs 50 being provided to reinforce the web 40 adjacent the intersection thereof with these portions and to prevent breakage at this junction which might otherwise occur.

In Figures 7 and 8 of the drawings, a still further alternative construction is shown, the car wheel in this embodiment being substantially of the construction as shown in Figures 1 and 2 and comprises a main hub portion 52, a crank pin hub 54 and a rim portion 56, spaced webs 58 and 60 extending between these portions in accordance with the previously described embodiments. In this alternative construction, a counter-balance portion 62 of box-like or pocket construction is also provided, and the rim portion 56, as well as the webs 58 and 60, are formed with openings such as 63 and 64, respectively, for the purpose of removing core forming material. In this car wheel construction, the same varies from the previously described structures in that a plurality of reinforcing ribs 66 are shown as being formed integral with the webs 58 and 60 which extend between the hub portions 52 and 54 and the rim portion 56, as well as between the hub portion 52 and the counter-balance portion 56, these ribs 66 being provided to reinforce the webs 58 and 60 and to provide a substantially stronger wheel construction.

In Figures 9 and 10 of the drawings, the webs 68 and 70 which extend between a rim portion 72 and hub portions (not disclosed) in the manner as hereinbefore described, are shown as being reinforced by means of a tubular member 74 which extends between the webs 68 and 70 and may be cast integral therewith to reinforce these webs at a plurality of points and to provide a rigid and strong construction.

In Figure 11 of the drawings, a still further alternative wheel construction is disclosed in which the spaced webs 80 and 82 which extend between the rim portion 84 and hub portion 86 in the manner as hereinbefore disclosed, vary in thickness therebetween and decrease in thickness outwardly from the hub portion 86, the greater thickness of these webs adjacent the hub portion 86 providing a substantially strong wheel particularly at the junction between these webs and the hub portion. The distribution of metal in these web portions 80 and 82 is such that a wheel adapted to withstand maximum stresses is provided with a minimum of material so as to provide a relatively light wheel construction.

While I have herein described and upon the drawings shown illustrative embodiments of the invention, it is to be understood that the invention is not limited thereto but may comprehend other constructions, arrangements of parts, details and features without departing from the spirit of the invention.

I claim:

1. A locomotive drive wheel comprising a rim portion, a main and crank pin hub, a counter-balance pocket having a wall forming a part of said rim portion, a substantially continuous web extending between said hubs and rim portion and having a part forming a wall for said counter-balance pocket, and another substantially continuous web spaced from said first-named web at said hubs and extending radially outwardly from said hubs and terminating in said rim portion and counter-balance pocket in spaced relation to the other of said webs.

2. A locomotive drive wheel comprising a rim portion, a main and crank pin hub, a counter-balance pocket having a wall forming a portion of said rim portion, a substantially continuous web extending between said hubs and rim portion and having a portion forming a wall of said pocket, said web being substantially normal to said rim portion, and a substantially continuous web spaced from said first-named web at said hubs and extending between said hubs and rim portion and between said main hub and said counter-balance pocket and terminating in a wall thereof in spaced relation to said first-named webs.

3. A wheel for a locomotive or the like, comprising a member formed with a rim portion, a main and crank pin hub, a counter-balance portion adjacent said rim portion, and spaced webs extending between said hubs and rim portion and between said main hub and counter-balance portion, said webs being in spaced relation throughout their entire width, said webs being imperforate except for an opening in one of said webs for removal of core forming material from the space therebetween.

4. A wheel for a locomotive or the like, comprising a member formed with a rim portion, a main and crank pin hub, a counter-balance portion adjacent said rim portion, and spaced webs extending between said hubs and rim portion and between said main hub and counter-balance portion, said webs being in spaced relation throughout their entire width, said webs being imperforate except that each of said webs is provided with an opening for removal of core forming material from the space therebetween.

5. A wheel for a locomotive or the like, comprising a member formed with a rim portion, a main and crank pin hub, a counter-balance portion adjacent said rim portion, and spaced webs extending between said hubs and rim portion and between said main hub and counter-balance portion, said webs being in spaced relation throughout their entire width, said webs being imperforate except that said webs are provided with spaced openings for removal of core forming material from the space therebetween.

6. A wheel for a locomotive or the like, comprising a member formed with a rim portion, a main and crank pin hub, spaced webs extending between said hubs and rim portion, and a wall between said webs and extending between oppositely disposed parts of said rim portion to provide a counter-balance portion for receiving counter-balance material, said webs being imperforate except for an opening in one of said webs for removal of core forming material from the space therebetween.

7. A wheel for a locomotive or the like, comprising a member formed with a rim portion, a main and crank pin hub, spaced webs extending between said hubs and rim portion, and a wall between said webs and extending between oppositely disposed parts of said rim portion to provide a counter-balance portion for receiving counter-balance material, said webs being imperforate except that each of said webs is provided with an opening for removal of core forming material from the space therebetween.

8. A wheel for a locomotive or the like, comprising a member formed with a rim portion, a main and crank pin hub, a counter-balance portion disposed between said rim portion and main hub, and spaced webs between said main hub and counter-balance portion and between said hubs and rim portion, said webs being connected to said hubs and counter-balance portion in spaced relation and being in spaced relation throughout their entire width and being imperforate except for an opening in one of said webs for removal of core forming material from the space therebetween.

9. A wheel for a locomotive or the like, comprising a member formed with a rim portion, a main and crank pin hub, a counter-balance portion disposed between said rim portion and main hub, and spaced webs between said main hub and counter-balance portion and between said hubs and rim portion, said webs being connected to said hubs and counter-balance portion in spaced relation and being in spaced relation throughout their entire width and being imperforate except that each of said webs is provided with an opening for removal of core forming material from the space therebetween.

10. A wheel for a locomotive or the like, comprising a member formed with a rim portion, a main and crank pin hub, a counter-balance pocket disposed between said rim and main hub, said pocket being formed in part by a portion of said rim and an oppositely disposed wall and spaced webs connecting said rim and wall, and spaced webs between said main hub and wall of said counter-balance pocket and between said hubs and rim portion, said webs being connected to said counter-balance portion in spaced relation and being imperforate except for an opening in one of said webs for removal of core forming material from the space therebetween.

11. A wheel for a locomotive or the like, comprising a member formed with a rim portion, a main and crank pin hub, a counter-balance pocket disposed between said rim and main hub, said pocket being formed in part by a portion of said rim and an oppositely disposed wall and spaced webs connecting said rim and wall, and spaced webs between said main hub and wall of said counter-balance pocket and between said hubs and rim portion, said webs being connected to said counter-balance portion in spaced relation and being imperforate except that each of said webs is provided with an opening for removal of core forming material from the space therebetween.

12. A wheel for a locomotive or the like, comprising a member formed with a rim portion, a main and crank pin hub, a counter-balance portion disposed between said rim portion and main hub, and spaced webs extending between said hubs and rim portion and between said main hub and counter-balance portion and terminating in said portion and hubs in spaced relation and being in spaced relation throughout their entire width, one of said webs intersecting said hubs, rim and counter-balance portions substantially normal and the other of said webs being disposed in angular relation thereto and intersecting said main hub in spaced relation to the plane of the outside edge of said rim portion, said webs being imperforate except that each is provided with an opening for removal of core forming material from the space therebetween.

13. A wheel for a locomotive or the like, comprising a member formed with a rim portion, a main and crank pin hub, a counter-balance portion disposed between said rim portion and main hub, and spaced webs extending between said hubs and rim portion and between said main hub and counter-balance portion and terminating in said portion and hubs in spaced relation and being in spaced relation throughout their entire width, and reinforcing members disposed between said webs and extending between said hubs and rim portion and between said main hub and counter-balance portion, said webs being imperforate except for an opening therein between said members for removal of core forming material from between said webs.

14. A wheel for a locomotive or the like comprising a member formed with a rim portion, a main and crank pin hub, a counter-balance portion adjacent said rim portion, and spaced webs extending between said hubs and rim portion and between said main hub and counter-balance portion, said webs terminating in said counter-balance portion in spaced relation, said webs being imperforate except for an opening in one of said webs.

15. A wheel for a locomotive or the like comprising a member formed with a rim portion, a main and crank pin hub, a counter-balance portion adjacent said rim portion, and spaced webs extending between said hubs and rim portion and between said main hub and counter-balance portion, said webs being in spaced relation throughout their entire width and terminating in said hubs counter-balance and rim portions in spaced relation, said webs being imperforate except for an opening in one of said webs.

16. A wheel for a locomotive or the like, comprising a member formed with a rim portion, a main and crank pin hub, a counter-balance portion adjacent said rim portion, and spaced webs extending between said hubs and rim portion and between said main hub and counter-balance portion, said webs terminating in said counter-balance portion in spaced relation, said webs having a plurality of relatively small aligned openings therein.

17. A wheel for a locomotive or the like, comprising a member formed with a rim portion, a main and crank pin hub, a counter-balance portion adjacent said rim portion, and spaced webs extending between said hubs and rim portion and between said main hub and counter-balance portion, said webs being in spaced relation throughout their entire width and terminating in said hubs, counter-balance and rim portions in spaced relation, said webs having a plurality of relatively small aligned openings therein.

18. A wheel for a locomotive or the like, comprising a member formed with a rim portion, a main and crank pin hub, a counter-balance portion adjacent said rim portion, spaced webs extending between said hubs and rim portion and between said main hub and counter-balance portion, said webs terminating in said counter-balance portion in spaced relation, said webs having a plurality of relatively small aligned openings therein, and a reinforcing member extending between said webs adjacent each of said relatively small aligned openings.

19. A wheel for a locomotive or the like, comprising a member formed with a rim portion, a main and crank pin hub, a counter-balance portion adjacent said rim portion, spaced webs extending between said hubs and rim portion and between said main hub and counter-balance portion, said webs being in spaced relation throughout their entire width and terminating in said hubs, counter-balance and rim portions in spaced relation, said webs having a plurality of relatively small aligned openings therein, and a reinforcing member extending between said webs adjacent each of said relatively small aligned openings.

HARRY E. DOERR.